United States Patent
Eguchi et al.

(10) Patent No.: US 10,101,061 B2
(45) Date of Patent: *Oct. 16, 2018

(54) CRYOGENIC REGENERATOR MATERIAL, REGENERATIVE CRYOCOOLER, AND SYSTEM INCLUDING REGENERATIVE CRYOCOOLER

(71) Applicant: KABUSHIKI KAISHA TOSHIBA, Minato-ku (JP)

(72) Inventors: Tomoko Eguchi, Yokohama (JP); Akiko Saito, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,610

(22) Filed: Feb. 27, 2017

(65) Prior Publication Data

US 2018/0051916 A1     Feb. 22, 2018

(30) Foreign Application Priority Data

Aug. 19, 2016 (JP) ................................. 2016-161432

(51) Int. Cl.
   *C09K 5/14* (2006.01)
   *F25B 9/14* (2006.01)
   *C01G 5/00* (2006.01)

(52) U.S. Cl.
   CPC .............. *F25B 9/145* (2013.01); *C01G 5/00* (2013.01); *C09K 5/14* (2013.01); *C01P 2002/74* (2013.01); *F25B 2309/1415* (2013.01)

(58) Field of Classification Search
   CPC ........ C09K 5/14; F25B 9/14; F25B 2309/003; F25B 9/145; F25B 2309/1415; C01G 5/00; C01P 2002/74; H01L 27/18
   USPC .......... 62/6, 638, 641, 909, 600; 252/67, 70; 505/825
   See application file for complete search history.

(56) References Cited

U.S. PATENT DOCUMENTS

| | | | |
|---|---|---|---|
| 6,847,278 B2 * | 1/2005 | Ito | H01F 6/00 335/216 |
| 2005/0217280 A1 | 10/2005 | Gschneidner, Jr. et al. | |
| 2007/0227159 A1 | 10/2007 | Murayama et al. | |
| 2008/0104967 A1 | 5/2008 | Satoh | |
| 2013/0216901 A1 | 8/2013 | Ortega et al. | |
| 2014/0374054 A1 * | 12/2014 | Xu | F28D 17/02 165/10 |
| 2017/0122625 A1 | 5/2017 | Endo et al. | |

FOREIGN PATENT DOCUMENTS

| | | |
|---|---|---|
| GB | 931260 A | 7/1963 |
| JP | 6-101915 | 4/1994 |
| JP | 9-14774 | 1/1997 |
| JP | 9-126569 | 5/1997 |
| JP | 2004-225920 | 8/2004 |
| JP | 2005-75963 | 3/2005 |
| JP | 2006-242484 | 9/2006 |
| JP | 5127226 | 1/2013 |
| JP | 2013-541815 | 11/2013 |
| JP | 5923619 | 5/2016 |
| JP | 2017-58079 A | 3/2017 |
| WO | WO 2006/022297 A1 | 3/2006 |
| WO | WO 2014/068628 A1 | 5/2014 |

OTHER PUBLICATIONS

A.P. Ramirez et al. "Large Low Temperature Specific Heat in the Negative Thermal Expansion Compound $ZrW_2O_8$", Physical Review Letters, vol. 80, No. 22, 1998, 4 pages.

N Ravi Chandra Raju, et al. "Physical properties of silver oxide thin films by pulsed laser deposition: effect of oxygen pressure during growth", Journal of Physics D: Applied Physics, 42, 2009, 6 pages.

Weifeng Wei, et al. "Oriented silver oxide nanostructures synthesized through a template-free electrochemical route", Journal of Materials Chemistry, 21, 2011, pp. 432-438.

* cited by examiner

*Primary Examiner* — Douglas J McGinty
(74) *Attorney, Agent, or Firm* — Oblon, McClelland, Maier & Neustadt, L.L.P.

(57) ABSTRACT

According to an embodiment, a cryogenic regenerator material contains a silver oxide. A molar ratio of silver atoms to oxygen atoms contained in the cryogenic regenerator material: Ag/O is 1.0 or more and 4.0 or less. The cryogenic regenerator material contains at least one selected from AgO, $Ag_2O$ and $Ag_3O$ as the silver oxide.

20 Claims, 5 Drawing Sheets

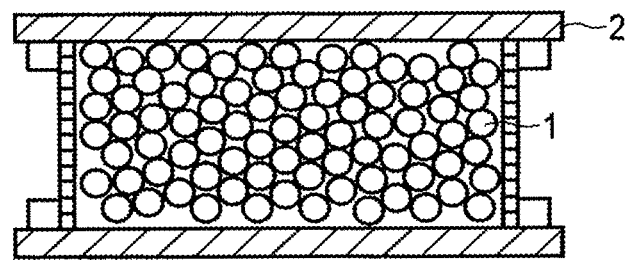
F I G. 1A
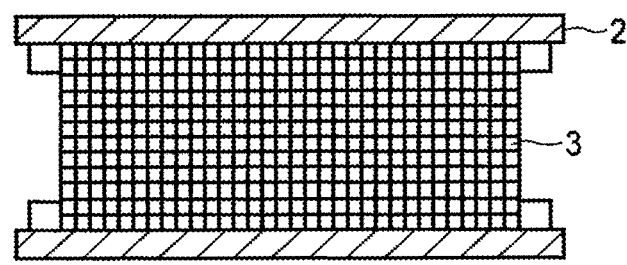
F I G. 1B
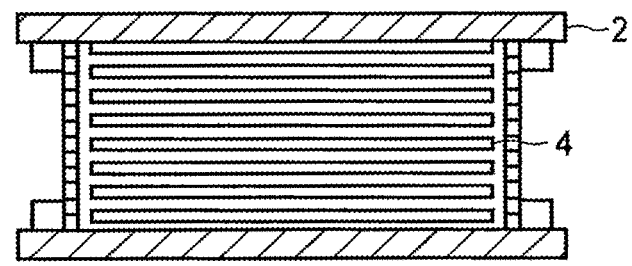
F I G. 1C

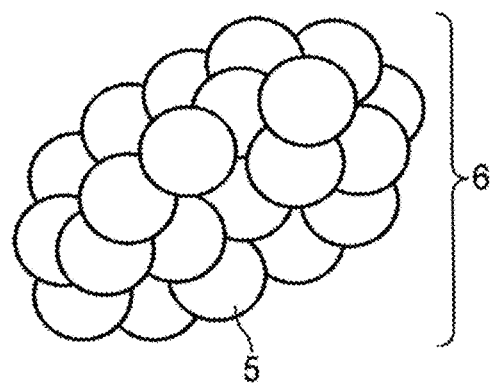
F I G. 2A
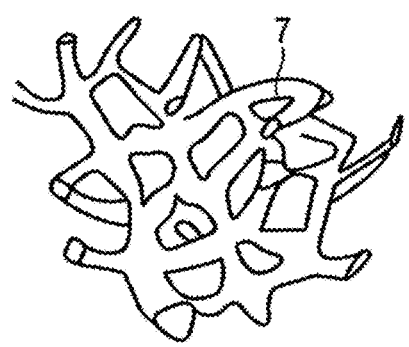
F I G. 2B

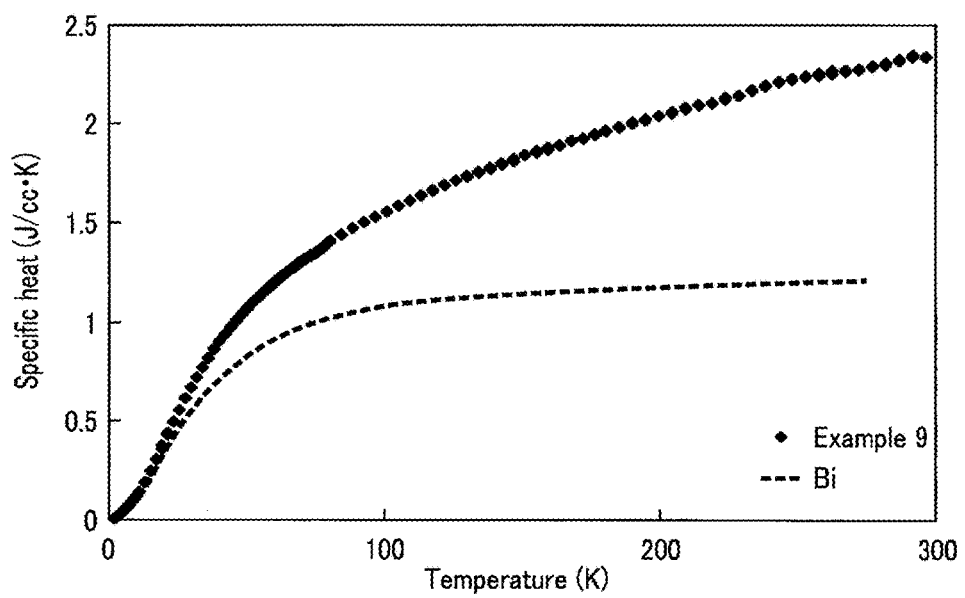
F I G. 6
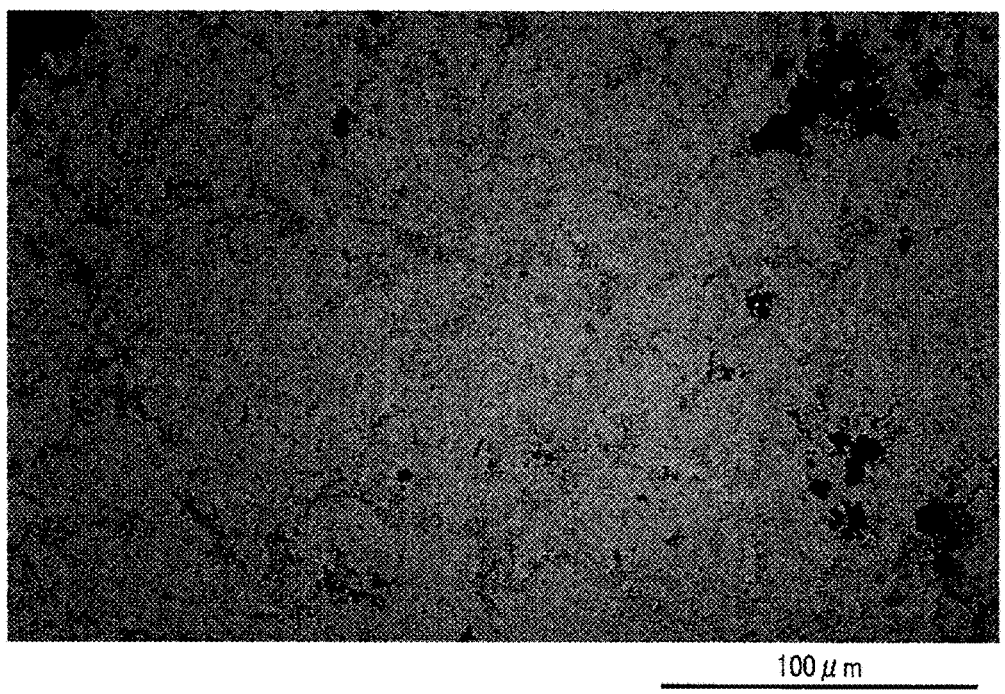
F I G. 7

CRYOGENIC REGENERATOR MATERIAL, REGENERATIVE CRYOCOOLER, AND SYSTEM INCLUDING REGENERATIVE CRYOCOOLER

CROSS-REFERENCE TO RELATED APPLICATION

This application is based upon and claims the benefit of priority from prior Japanese Patent Application No. 2016-161432, filed Aug. 19, 2016, the entire contents of which are incorporated herein by reference.

FIELD

Embodiments described herein relate generally to a cryogenic regenerator material, a regenerative cryocooler, and a system including a regenerative cryocooler.

BACKGROUND

Superconducting magnets used in the systems such as magnetic resonance imaging systems (MRI) and accelerators work at a cryogenic temperature of several tens of K or lower. In general, this cryogenic ambient condition is generated by regenerative cryocoolers such as the Gifford-McMahon (GM) cryocoolers. In the regenerative cryocoolers, appropriate regenerator materials are used in consideration of their temperature dependences of specific heat. Currently, commonly used Gifford-McMahon cryocoolers comprise materials of Cu, Pb and rare earth-based compounds such as $HoCu_2$ or $Er_3Ni$ as the regenerator materials working effectively for a temperature range from room temperature to about 100 K, for a temperature range from about 100 K to 10 K, and for a cryogenic temperature range below 10 K, respectively.

In recent years, Pb has been considered to be a material which has a high burden on the environment, and a system which does not use Pb is required. Before now, materials such as Bi, Sn and their compounds were proposed as substitutes for the Pb regenerator material.

However, there has been a problem that the materials such as Bi, Sn and the compounds containing them as main components have insufficient specific heat at low temperatures, and thus the cooling properties of the cryocoolers using regenerators filled with such materials as the regenerator materials are inferior to those of cryocoolers using Pb.

In the refrigeration cycle of regenerative cryocoolers such as Gifford-McMahon cryocoolers, pulse tube cryocoolers and Stirling coolers, high-pressure working gas reciprocally flows through the void in regenerator materials filled in a regenerator. Since the heat generated during the compression-expansion cycle of the gas in the cryocoolers is accumulated in the regenerator material to achieve cooling from room temperature to cryogenic temperature, rapid heat transfer from gas to the regenerator material is desired. Thus, efficient heat transfer between the gas and regenerator material, and heat diffusion in the regenerator material are important, so that the regenerator material is required to have high thermal conductivity. Further, in the case of Gifford-McMahon cryocoolers and Stirling cryocoolers, regenerators themselves filled with regenerator materials also move reciprocally. Therefore, regenerator materials preferably have high mechanical strength not to be broken while running the refrigeration cycle.

BRIEF DESCRIPTION OF THE DRAWINGS

FIG. 1A is a cross-sectional view showing the main constitution of a cryogenic regenerator according to a first embodiment;

FIG. 1B is a cross-sectional view showing the main constitution of a cryogenic regenerator according to a second embodiment;

FIG. 1C is a cross-sectional view showing the main constitution of a cryogenic regenerator according to a third embodiment;

FIG. 2A is a schematic view showing an example of the shape of a cryogenic regenerator material according to an embodiment;

FIG. 2B is a schematic view showing another example of the shape of a cryogenic regenerator material according to an embodiment;

FIG. 6 is a graph showing a temperature dependence of specific heat for the cryogenic regenerator material of Example 9; and FIG. 7 is a cross-sectional image by a scanning electron microscope for the cryogenic regenerator material of Example 9.

DETAILED DESCRIPTION

Figure 3:
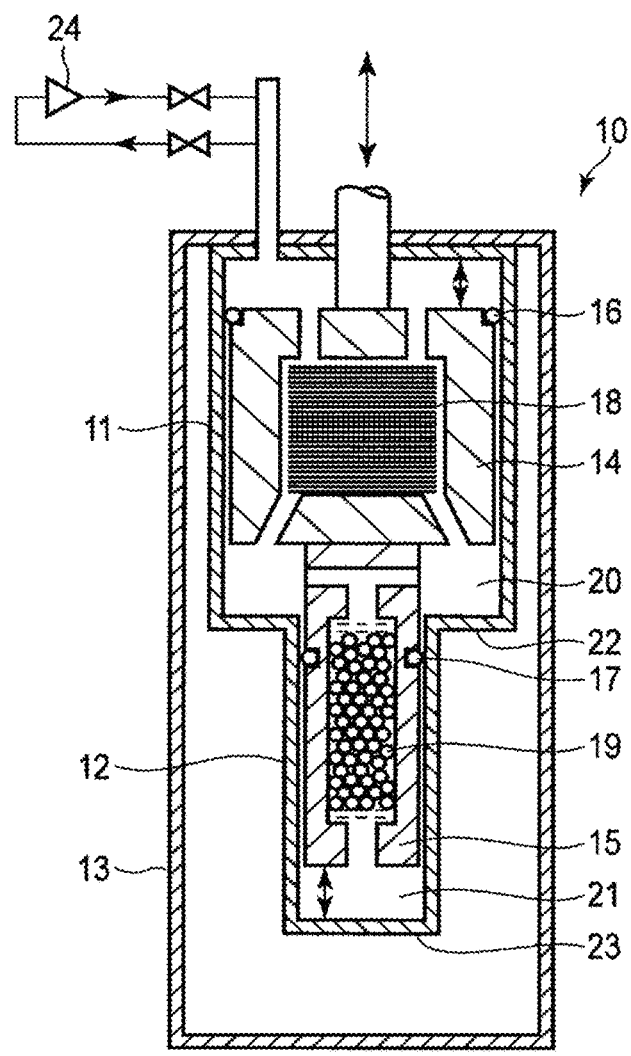
FIG. 3 is a cross-sectional view showing the main constitution of a regenerative cryocooler according to an embodiment.

Embodiments will be described below in detail.

The cryogenic regenerator material according to embodiments is a cryogenic regenerator material containing silver oxide. In the cryogenic regenerator material, the molar ratio of silver atoms to oxygen atoms: Ag/O is 1.0 or more and 4.0 or less.

The cryogenic temperature described herein means, for example, a temperature range in which a superconductivity phenomenon can be applied as a technology, and indicates a temperature in a range of 100 K or less in an embodiment or of 20 K or less in another embodiment.

The cryogenic regenerator material according to embodiments contains one or more silver oxides. The molar ratio of silver atoms to oxygen atoms contained in the cryogenic regenerator material of the embodiments: Ag/O (hereinafter also referred to as "molar ratio x of silver atoms to oxygen atoms", "molar ratio x", or "x") satisfies the condition of 1.0 or more and 4.0 or less.

The cryogenic regenerator material of the embodiments satisfying the above condition provides a low environmental load as well as a high specific heat in the cryogenic region and excellent thermal conductivity and mechanical strength.

In the refrigeration cycle of regenerative cryocoolers such as Gifford-McMahon cryocoolers, pulse tube cryocoolers and Stirling cryocoolers, working gas such as helium reciprocally flows through the void in regenerator materials filled in the regenerator, and the heat generated during the compression-expansion cycle of the gas is accumulated in the regenerator material to achieve cooling from room temperature to cryogenic temperature. Thus, the regenerator material is required to have high specific heat property in the temperature range from room temperature to cryogenic temperature.

As the result of research on many materials, it has been found that the material containing a silver oxide provides a particularly advantageous property showing high specific heat in the cryogenic temperature range. In addition, as a result of further dedicated research, it has been found that the regenerator material containing a silver oxide provides extremely high specific heat property as well as a good thermal conductivity and mechanical strength where the molar ratio of silver atoms to oxygen atoms x (Ag/O) contained therein is $1.0 \leq x \leq 4.0$. In the case where $x<1.0$ or $x>4.0$, such regenerator materials do not show significantly high specific heat property.

In an embodiment, the more preferable molar ratio (x) of silver atoms to oxygen atoms to provide particularly high specific heat property is $1.8 \leq x \leq 3.2$. For the regenerator material used in cryocoolers, specific heat property is particularly important. A regenerator material of low specific heat property cannot provide high refrigeration performance, even though it has good thermal conductivity and mechanical strength.

The composition of the regenerator material can be determined by, for example, scanning electron microscopy/energy dispersive X-ray spectroscopy (SEM/EDX). A cross section of the regenerator material is observed with a scanning electron microscope (SEM) at a magnification of, for example, 500× or more and 10,000× or less. The composition of the elements contained in the regenerator material can be determined by analyzing elements on the entire cross section by energy dispersive X-ray spectroscopy (EDX).

The composition of the elements contained in the whole regenerator material can also be determined by another compositional analysis method, which is not nondestructive analysis, such as by a method of identifying the silver and oxygen contents using inductive coupled plasma (ICP) emission spectrophotometry and an inert gas fusion method.

The molar ratio x of silver atoms to oxygen atoms can be evaluated by using SEM/EDX. For example, in a region of 10 to 50 μm square in a cross-section of a regenerator material where only Ag and O are detected, the molar ratio of Ag atoms to O (oxygen) atoms is evaluated, and the calculated value is recorded as x1. In the same manner, the cross section of the regenerator material is observed in different ten fields to evaluate the values of x1 to x10, and the average of the values of x1 to x10 is defined as the molar ratio x.

The cryogenic regenerator material according to embodiments contains one or more silver oxides. In an embodiment, the silver oxide preferably contains at least one selected from the group consisting of AgO, $Ag_2O$, and $Ag_3O$.

The silver oxide is contained as a main component in the cryogenic regenerator material according to embodiments. In an embodiment, the content of the silver oxide (or the total content of the silver oxide when two or more types of silver oxides are contained) in the cryogenic regenerator material is preferably 50% by volume or more based on the whole volume of the cryogenic regenerator material, from the viewpoint of increasing the specific heat per unit volume in the cryogenic temperature range. The content of silver oxide is more preferably from 50 to 100% by volume, and even more preferably from 80 to 100% by volume.

The content of the silver oxide can be calculated by Rietveld analysis for X-ray diffraction (XRD), or evaluation of phase ratios between multiple fields by SEM observation.

In an embodiment, the cryogenic regenerator material preferably contains two phases of silver oxides, i.e., the first and second phases of silver oxides, having different crystal structures. In the refrigeration cycle, if the heat transferred from the working gas to the regenerator material does not sufficiently conduct into the regenerator material during the cycle time, the regeneration effect of the regenerator material cannot be sufficiently utilized. Thus, the regenerator material is required to have high thermal conductivity. When the cryogenic regenerator material according to the embodiment contains two phases of silver oxides (the first and second phases of silver oxides) having different crystal structures, a high specific heat property as well as high thermal conductivity can be provided. The cryogenic regenerator material according to the embodiment may further contain a third phase of silver oxide, or a fourth or a further phase of silver oxide.

Here, in the XRD spectrum, main peaks corresponding to respective phases are assigned as the first, second, and third phases of silver oxides and so on in descending order of peak half widths. The main peak in the XRD spectrum means the peak having the highest diffraction intensity in the peaks specific to the corresponding phase of crystal structure.

In an embodiment, a combination of a first phase of silver oxide with a second phase of silver oxide, which has a higher density than the first phase of silver oxide owing to difference in the crystal structure, allows to further improve the specific heat property per unit volume of the regenerator material. In another embodiment, a combination of a first phase of silver oxide with a second phase of silver oxide, which has higher thermal conductivity than the first phase of silver oxide owing to difference in the crystal structure, allows to further improve the thermal conductivity of the entire regenerator material. The crystal structure of the silver oxide can be determined by XRD, for example.

In a GM cryocooler and a Stirling cryocooler, the regenerator itself filled with the regenerator material also reciprocally moves. Thus, the regenerator material preferably has high mechanical strength. For example, when a first phase of silver oxide has a high negative thermal expansion property, combination of the first phase of silver oxide with a second phase of silver oxide, which has a smaller negative thermal expansion property than the first phase of silver oxide or a positive thermal expansion property owing to difference in the crystal structure, allows to suppress thermal expansion of the regenerator material with temperature change and to improve the mechanical strength of the regenerator material. In addition, suppression of thermal expansion of the regenerator material allows to improve stability and reliability of the regenerator material and cryocooler in a long-term operation of the cryocooler.

The cryogenic regenerator material according to the embodiment is preferably in such a state that, assuming that A is a half width of a main peak of the first phase of silver oxide and B is a half width of a main peak of the second phase of silver oxide in XRD spectrum, the following condition is satisfied: $A/B \geq 1.2$. The smaller the crystallite size, the larger the half width of the XRD peak. Accordingly, the condition of $A/B \geq 1.2$ indicates that the crystallite of the first phase of silver oxide is smaller than the crystallite of the second phase of silver oxide. When the first phase of silver oxide has a small crystallite size, or lower crystallinity, the part of the first phase of silver oxide tends to develop certain lattice vibrations, leading to an improved specific heat property, for example. When the second phase of silver oxide has a large crystallite size, or higher crystallinity, the part of the second phase of silver oxide comes to have higher thermal conductivity. As a result, both of higher specific heat by the first phase of silver oxide and higher thermal conductivity of the second phase of silver oxide are provided.

From the above viewpoint, it is more preferred that the condition of A/B≥3.0 is satisfied. The upper limit of the A/B ratio is not particularly limited, but the condition of 20≥A/B may be satisfied.

In the cryogenic regenerator material according to the embodiment, the first phase of silver oxide preferably has a cubic crystal structure and the second phase of silver oxide preferably has a hexagonal crystal structure, for example. Since the cubic and hexagonal crystal structures can take a closest-packed structure among crystal structures, the cryogenic regenerator material having these crystal structures can contain increased number of atoms per unit volume, so that such cryogenic regenerator material can increase the specific heat attributable to the lattice vibration per unit volume.

In the cryogenic regenerator material according to an embodiment, the first phase of silver oxide is preferably $Ag_2O$ and the second phase of silver oxide is preferably $Ag_3O$, for example. $Ag_2O$ provides particularly high specific heat among silver oxides. The reason for this is that $Ag_2O$ develops marked libration, and has high effect of increasing specific heat in the cryogenic temperature range. $Ag_3O$ has a smaller effect of increasing specific heat than $Ag_2O$, but has a higher density than $Ag_2O$, and thus has an effect of increasing specific heat per unit volume of the regenerator material. In addition, $Ag_3O$ has a higher thermal conductivity than $Ag_2O$, and thus can further increase the entire thermal conductivity of the regenerator material. It is known that a compound having a tetrahedral or octahedral structure in which metallic elements are arranged at respective apexes and a nonmetallic element (O, S, N, F) is arranged at the center, or a compound having a tetrahedral or octahedral structure in which nonmetallic elements (O, S, N, F) are arranged at respective apexes and a metallic element is arranged at the center develops "librational motion of atoms" (see, for example, A. P. Ramirez et al., Physical Review Letters, vol. 80, pp. 4903-4906 (1998)). As a result of examining many substance systems, the present inventors found that $Ag_2O$ shows particularly remarkable "librational motion of atoms" and has higher effect of increasing specific heat in the cryogenic temperature range.

In the cryogenic regenerator material according to an embodiment, the first phase of silver oxide is preferably present at grain boundaries of the second phase of silver oxide, for example. The grain boundaries mean the boundaries between crystal grains, i.e., the parts having a uniform crystal orientation. For example, the first phase of silver oxide is present in an interspersed form or a developed network form at the grain boundaries of the second phase of silver oxide. When the cryogenic regenerator material takes such forms, the first and second phases of the silver oxides are dispersed in the entire regenerator material, leading to uniformed thermal conductivity in the whole regenerator material.

The presence of the first phase of silver oxide at the grain boundaries of the second phase of silver oxide can be observed by, for example, SEM/EDX. The regenerator material is observed with SEM on across section for an area where contrast appears in the backscattered electron image at a magnification set to 500× or more and 10,000× or less, for example. The light and shade forming the contrast in the backscattered electron image reflect the density of the material. Further, in the same observation image, mapping of Ag and O elements using EDX allows to specify the positions of the first and second phases of the silver oxides forming the contrast in the backscattered electron image.

In another method, the presence of the first phase of silver oxide at the grain boundaries of the second phase of silver oxide can be observed by, for example, transmission electron microscope (TEM). The regenerator material is observed with TEM in a region of, for example, 10 to 100 µm square on a cross section for an area where contrast appears. The light and shade forming the contrast in the TEM image reflect the density of the material. Further, in the same observation image, mapping of Ag and O elements is carried out by using EDX, and structural analysis is carried out by using electron diffraction in different areas of silver oxide forming the contrast. Since the electron diffraction spots are peculiar to the crystal structures, the positions of the first and second phases of silver oxides having different crystal structures can be determined by this method.

The cryogenic regenerator material according to an embodiment is, for example, preferably powder aggregate, and more preferably a bulk body which is a sintered body of the powder aggregate. The reason for this is that the bulk body can increase the ratio of the real density to the theoretical density.

As described above, in a regenerative cryocooler such as a GM cryocooler, a pulse tube cryocooler, or a Stirling cryocooler, the working gas such as helium gas reciprocally flows through the void in the regenerator materials filled in the cryogenic regenerator. Accordingly, the regenerator material preferably has a shape and a size promoting heat exchange with the working gas without inhibiting the flow of the working gas when filled in the cryogenic regenerator.

From the viewpoints of a filling rate in the regenerator, suppression of a pressure loss of the working gas (absence of flow inhibition), and promotion of heat exchange with the working gas, the cryogenic regenerator material according to an embodiment is preferably in the form of particles of powder aggregate, and more preferably in the form of a bulk body which is a sintered body of the particles of the powder aggregate. The reason for this is that the bulk body can increase the ratio of real density to the theoretical density.

The form of the regenerator material may be, for example, a particle shape, a porous shape, a mesh structure, a thin plate, or a corrugated plate.

The particle shape is particularly preferably spherical, and may be in any smooth shape having rotational symmetry such as a barrel shape, a disk shape, or a spheroidal shape. Particles having such shapes may advantageously make the flow of the working gas smooth and suppress the pressure loss. In this case, the particle preferably has such a size that a minor axis is 0.05 mm or more and a major axis is 1 mm or less. When the minor axis of the particle is 0.05 mm or more, a sufficient void in the regenerator material particles filled in the regenerator or a sufficient space through which the working gas is provided, by which the pressure loss of the gas can be reduced, leading to improved refrigeration performance. When the major axis of the particle is 1 mm or less, a sufficient surface area of the regenerator material in the regenerator is provided, by which heat exchange efficiency between the working gas and regenerator material can be enhanced, leading to improved refrigeration performance. The major axis is more preferably 0.5 mm or less. It is preferable that the particles having above-described size are filled in the cryogenic regenerator at a filling rate of 50 to 75%. A more preferable filling rate is from 55 to 65%.

The size of the particles can be measured with a commercially available particle size analyzer based on dynamic image analysis or laser diffraction. The size of the particles filled in the cryogenic regenerator may be the average particle size of 30 particles randomly selected from the filled particles.

When particles are filled in the cryogenic regenerator, the range of the particle size can be classified by using sieves having different apertures. The apertures of the commercially available sieves are shown in Table 1.

TABLE 1

Aperture of commercial sieve

| | Sieve aperture (mm) | | | | | | | | | | | | | | | | | |
|---|---|---|---|---|---|---|---|---|---|---|---|---|---|---|---|---|---|---|
| | 1 | 0.85 | 0.71 | 0.6 | 0.5 | 0.425 | 0.355 | 0.3 | 0.25 | 0.212 | 0.18 | 0.15 | 0.125 | 0.106 | 0.09 | 0.075 | 0.063 | 0.053 |
| Tyler (mesh) | 16 | 20 | 24 | 28 | 32 | 35 | | 42 | 48 | 60 | 65 | 80 | 100 | 115 | 150 | 170 | 200 | 250 | 270 |
| USA (mesh) | 18 | 20 | | 25 | 30 | 35 | 40 | 45 | 50 | 60 | 70 | 80 | 100 | 120 | 140 | 170 | 200 | 230 | 270 |

FIG. 1A is a cross-sectional view showing the main constitution of a cryogenic regenerator according to an embodiment, in which the cryogenic regenerator material 1 in a particle form is filled in the cryogenic regenerator 2.

FIG. 1B is a cross-sectional view showing the main constitution of the cryogenic regenerator according to an embodiment, in which the cryogenic regenerator material 3 of a mesh structure is arranged in the cryogenic regenerator 2.

FIG. 1C is a cross-sectional view showing the main constitution of the cryogenic regenerator according to an embodiment, in which the cryogenic regenerator material 4 in the form of a thin plate is arranged in the cryogenic regenerator 2. In place of the cryogenic regenerator material 4 in the form of a thin plate, a cryogenic regenerator material in the form of a corrugated plate may be used, or a cryogenic regenerator material in the form of a corrugated plate arranged to form a honeycomb structure may be used.

The cryogenic regenerator material according to another embodiment can be in a form of a composite torus structure 6 having a shape like a bunch of grapes as shown in FIG. 2A, in which the above-described particles of powder aggregate are combined together, or in a form of a blood capillary-shaped structure 7 as shown in FIG. 2B.

The cryogenic regenerator material according to an embodiment preferably has, for example, an Ag coating layer formed on the surface thereof.

In the cryocooler, the regenerator reciprocally moves when refrigeration cycle operations are carried out over a long period of time. If the strength of the regenerator material is insufficient, fine dust may be occurred due to the reciprocal movement, by which pressure loss may be increased to cause deterioration of refrigeration performance. When the Ag coating layer is formed on the surface of the regenerator material of the silver oxide, Ag having ductility suppresses the fine dust occurrence even if the load by the reciprocal movement is applied to the regenerator material, leading to enhanced reliability of the cryocooler. In addition, since Ag has high thermal conductivity in the cryogenic temperature range, the presence of metallic Ag on the surface of the regenerator material of the silver oxide allows rapid diffusion of heat received from helium gas into the regenerator material.

The thickness of the Ag coating layer is preferably 10 nm or more and 10 μm or less. The Ag coating layer having a thickness of 10 nm or more is preferred from the viewpoint of the effect of suppressing occurrence of fine dust of the regenerator material and the effect of accelerating heat transfer. The Ag coating layer having a thickness of 10 μm or less is preferred from the viewpoint of eliminating the risk of decrease of the proportion of silver oxide in the regenerator material, and improving the specific heat property of the whole regenerator material. The thickness of the Ag coating layer can be determined, for example, from the observation image of a cross section of the regenerator material by SEM or TEM. The Ag coating layer may be formed on the whole surface or a part of the surface of the regenerator material.

The regenerator material may contain Ag in the inside thereof. When Ag is contained in the inside of the regenerator material, the thermal conductivity of the whole regenerator material may be improved. Further, since Ag has a positive coefficient of thermal expansion, when a silver oxide has a negative thermal expansion coefficient, the presence of Ag in the inside of regenerator material suppresses a volume change of the regenerator material in the cryogenic temperature range, leading to improved reliability of the cryocooler.

The regenerator material may contain Na, Ca, or Mg in the inside thereof. As a technique of forming a regenerator material in the form of particles, ionic crosslinking reaction of alginic acid may be used. The presence of a crosslinked membrane of alginic acid containing Na, Ca, or Mg in the inside of the regenerator material of silver oxide may suppress occurrence of fine dust from the regenerator material and may improve the mechanical strength of the regenerator material.

A regenerative cryocooler according to an embodiment will now be described.

FIG. 3 is a cross-sectional view showing the main constitution of a regenerative cryocooler according to an embodiment, which is a two-stage expansion type. The two-stage regenerative cryocooler 10 shown in FIG. 3 is an example of a cryocooler. The two-stage cryocooler 10 shown in FIG. 3 includes a vacuum vessel 13 in which a first cylinder 11 with a large diameter and a second cylinder 12 with a small diameter coaxially connected with the first cylinder 11 are installed. A first regenerator 14 is reciprocal movably mounted in the first cylinder 11, and a second regenerator 15, which is the cryogenic regenerator according to embodiments, is reciprocal movably mounted in the second cylinder 12.

Sealing rings 16 and 17 are arranged between the first cylinder 11 and the first regenerator 14 and between the second cylinder 12 and the second regenerator 15, respectively.

A first regenerator material 18 such as a copper alloy meshes is arranged in the first regenerator 14. The term copper alloy means herein pure copper and a metal made of copper and another metallic element. The cryocooler regenerator material according to any of the embodiments is filled as a second regenerator material 19 in the second regenerator 15 in a predetermined proportion. The first regenerator 14 and the second regenerator 15 each have channels for a working medium such as He gas, which are provided, for example, in the void in the first regenerator materials 18 and the void in the cryocooler regenerator materials 19. As the first regenerator material 18, a stainless steel mesh may be used instead of the copper alloy mesh, or both the copper alloy mesh and the stainless steel mesh may be used. FIG. 3 shows the regenerative cryocooler in which the first regenerator material 18 and the second regenerator material 19 are filled in different regenerators, but the first regenerator material 18 and the second regenerator material 19 may be filled in an identical regenerator. Use of the second regenerator material 19 prepared by replacing a part or all of the conventional Pb regenerator material with the regenerator material according to the embodiments can provide a system with a low environmental load. The second regenerator material 19 may be prepared by combining the regenerator material according to an embodiment and a magnetic regenerator material made of a rare earth compound. In this case, it is effective that the inside of the second regenerator 15 is partitioned with a mesh into separate spaces, and the regenerator material according to an embodiment and a magnetic regenerator material made of a rare earth compound are filled respective spaces. At this time, the filling rate of the regenerator material according to an embodiment in the partitioned space is preferably 50 to 75%, and more preferably 55 to 65%.

A first expansion chamber 20 is provided between the first regenerator 14 and the second regenerator 15. A second expansion chamber 21 is provided between the second regenerator 15 and the end wall of the second cylinder 12. A first cooling stage 22 is formed on the bottom of the first expansion chamber 20, and a second cooling stage 23, having a temperature lower than that of the first cooling stage 22, is formed on the bottom of the second expansion chamber 21.

A high-pressure working medium (e.g. He gas) is supplied to the two-stage regenerative cryocooler 10 as described above from a compressor 24. The supplied working medium passes through the void in the first regenerator materials 18 in the first regenerator 14 to reach the first expansion chamber 20, and further passes through the void in the cryocooler regenerator materials (second regenerator materials) 19 in the second regenerator 15 to reach the second expansion chamber 21. In this process, the working medium is cooled in exchange for supplying thermal energy to the regenerator materials 18 and 19. After passing through the void in the regenerator materials 18 and the void in the regenerator materials 19, the working medium expands in the expansion chambers 20 and 21 to generate cold, which cools the cooling stages 22 and 23. The expanded working medium flows through the void in the regenerator materials 18 and the void in the regenerator materials 19 in the reverse direction. The working medium receives thermal energy from the regenerator materials 18 and 19 and is then discharged. The cryocooler is configured to improve the heat efficiency of working medium cycle and achieve even lower temperature as a heat recovery effect is enhanced in such process.

In another embodiment, provided is a system comprising the regenerative cryocooler according to any of the above-described embodiments.

Examples of such system include a superconducting electromagnet apparatus, a magnetic resonance imaging (MRI) apparatus, a cryopump apparatus, a Josephson voltage standard system, and a single-crystal pulling apparatus under magnetic field application each comprising the regenerative cryocooler according to any of the embodiments. The regenerator materials according to embodiments do not exhibit magnetic properties, and thus have marked advantages particularly when used for the systems utilizing the magnetic field among the above-described systems including a regenerative cryocooler. If a magnetic regenerator material is used for the regenerative cryocooler, there arises a problem that specific heat of the regenerator material is changed by the magnetic field regardless of whether the regenerator material exhibits ferromagnetism or antiferromagnetism and the regeneration property is made unstable. In addition, when a magnetic regenerator material is used in such a system that the regenerative cryocooler is disposed in a magnetic field gradient such as a superconducting electromagnet apparatus, an MRI apparatus and a single-crystal pulling apparatus under magnetic field application, the magnetic regenerator material receives a force caused by the magnetic field. The regenerator, which reciprocally moves up and down, also receives such an imbalanced force that impairs the seal 17, and thus the refrigeration performance may be deteriorated remarkably. Further, since magnetic noise occurs when the regenerator filled with the magnetic regenerator material reciprocally moves up and down, the magnetic noise may seriously affects detection signals particularly in an MRI apparatus. On the contrary, since the regenerator material according to any of the embodiments does not have magnetic properties, the regenerator material will not generate magnetism noise, and is suitable for the use in the MRI apparatus. Further, since the regenerator material according to any of the embodiments receives no force in the magnetic field gradient and will not exhibit change in the specific heat, the regenerator material will not deteriorate the refrigeration performance of the cryocooler even in the above-described systems utilizing the magnetic field and allows to provide systems which can be operated stable for a long period of time.

EXAMPLES

Example 1

Two grams of $Ag_2O$ powder was weighed, and subjected to heat treatment under a pressure of 980 Mpa and at a temperature of 130° C. for 10 hours to obtain a sintered body. A cross section of the sintered body sample was observed and analyzed by SEM/EDX (FE-SEM SU-8020, manufactured by Hitachi High-Technologies Corporation). Only Ag and O were detected in the whole sample, showing that the sintered body contained silver oxide.

[Identification of Crystal Structure]

A part of the sintered body obtained as above was cut out and pulverized, and then analyzed by XRD (Smartlab, manufactured by Rigaku Corporation). It was found that the sintered body had a hexagonal crystal structure.

[Molar Ratio x]

A cross section of the sintered body obtained as above was observed by SEM, and subjected to EDX analysis in the region of 20 μm square. The molar ratio $x1$ of Ag atoms to O atoms was found to be 3.2. In the same manner, the cross section of the regenerator material was observed in different ten fields. The average of $x1$ to $x10$, or the molar ratio $x$ of Ag atoms to O atoms was found to be 3.2.

[Volume Ratio]

A cross section of the sintered body obtained as above was observed in several fields by SEM, and the volume ratio of silver oxide to the whole volume of the sintered body was calculated from three-dimensional structural analysis. The volume ratio of silver oxide was found to be 85%.

[Specific Heat]

A part of the sintered body obtained as above was cut out to prepare a sample of about 2 mm square. The specific heat of the sample was measured using a physical property measurement system (PPMS). The specific heat of the sample at 60 K was found to be 1.16 J/cc·K.

[Thermal Conductivity]

A part of the sintered body obtained as above was cut out to prepare a sample of about 2 mm×2 mm×7 mm. The thermal conductivity of the sample was measured using PPMS. The thermal conductivity of the sample at 60 K was found to be 1.38 W/K·m.

[Mechanical Strength]

A part of the sintered body obtained as above was cut out to prepare a sample of about 2 mm square. A load was applied to the sample at the center point on one surface of the sample until the sample was broken, and the load when the sample was broken was determined as mechanical strength.

The load was measured in the same manner for the samples of Examples 2 to 8 and Comparative Examples 1 and 2 described below. Tables 2 and 3 below show the relative load values for the samples of Examples 2 to 8 and Comparative Examples 1 and 2, with the load value measured for the sample of Example 1 set at 1.0 (reference value).

Example 2

An evaluation sample was prepared and measured in the same manner as in Example 1, except that 2 g of AgO powder was weighed, and subjected to heat treatment under a pressure of 40 Mpa and at a temperature of 130° C. for 1 hour. The results are shown in Table 2.

Example 3

An evaluation sample was prepared and measured in the same manner as in Example 1, except that 2 g of AgO powder was weighed, and subjected to heat treatment under a pressure of 40 Mpa and at a temperature of 95° C. for 1 hour. The results are shown in Table 2.

Example 4

An evaluation sample was prepared and measured in the same manner as in Example 1, except that the heat treatment was carried out at 180° C. The results are shown in Table 2.

Comparative Example 1

The sintered body obtained in Example 3 was subjected to heat treatment in oxygen atmosphere under atmospheric pressure and at a temperature of 95° C. for 5 hours to prepare a sample. The sample thus obtained was measured in the same manner as in Example 1. The results are shown in Table 2.

Comparative Example 2

An evaluation sample was prepared and measured in the same manner as in Example 1, except that the heat treatment was carried out at 200° C. The results are shown in Table 2.

TABLE 2

|  | Molar ratio x (Ag/O) | Silver oxide | Volume ratio [%] | Specific heat (J/cc · K) | Heat conductivity (W/K · m) | Mechanical strength (relative strength*) |
|---|---|---|---|---|---|---|
| Example 1 | 3.2 | $Ag_3O$ Hexagonal | 85 | 1.16 | 1.38 | (Reference value: 1.0) |
| Example 2 | 1.8 | AgO Monoclinic | 56 | 1.17 | 1.30 | 1.0 |
| Example 3 | 1.0 | AgO Monoclinic | 100 | 1.05 | 1.20 | 1.0 |
| Example 4 | 4.0 | $Ag_3O$ Hexagonal | 50 | 1.06 | 1.42 | 1.0 |
| Comparative Example 1 | 0.9 | AgO Monoclinic | 100 | 0.80 | 0.88 | 0.95 |
| Comparative Example 2 | 4.1 | $Ag_3O$ Hexagonal | 48 | 0.93 | 1.42 | 0.96 |

*Relative strength shows the relative value where the load value in the measurement of mechanical strength in Example 1 is set at the reference value (1.0).

In the results shown in Table 2 and Table 3, which will be shown later, the thermal conductivity is preferably 1.00 W/K·m or more.

Example 5

One gram of $Ag_2O$ powder and 1 g of Ago powder were mixed, and subjected to heat treatment under a pressure of 40 Mpa and at a temperature of 95° C. for one hour to obtain a sintered body. A cross section of the sintered body sample was observed and analyzed by SEM/EDX. Only Ag and O were detected in the whole sample, showing that the sintered body contained silver oxide. The molar ratio x of Ag atoms to O atoms was found to be 1.5.

[Identification of Crystal Structure]

A part of the sintered body obtained as above was cut out and pulverized, and then analyzed by XRD (Smartlab, manufactured by Rigaku Corporation). It was found that the crystal structure of the first phase of silver oxide ($Ag_2O$) was cubic, and the crystal structure of the second phase of silver oxide (AgO) was monoclinic. The half width of the main peak of the first phase of silver oxide A was 0.61, and the half width of the main peak of the second phase of silver oxide B was 0.25, resulting in A/B=2.4.

The volume ratio, specific heat, thermal conductivity, and relative strength of silver oxide were measured in the same manner as in Example 1. The results are shown in Table 3.

Example 6

Zero point four grams of Ag$_2$O powder was weighed, and subjected to heat treatment under a pressure of 980 Mpa and at a temperature of 130° C. for 8 hours to obtain a sintered body. The powder prepared by pulverizing the above sintered body, 0.8 g of Ag$_2$O powder and 0.8 g of Ago powder were mixed, and subjected to heat treatment under a pressure of 40 Mpa and at a temperature of 95° C. for 1 hour to obtain a sintered body. Except for the above conditions, measurements of the sintered body were carried out in the same manner as in Example 5. The results are shown in Table 3.

Example 7

One gram of Ag$_2$O powder was weighed, and subjected to heat treatment under a pressure of 980 Mpa and at a temperature of 130° C. for 8 hours to obtain a sintered body. The powder prepared by pulverizing the above sintered body and 1 g of Ago powder were mixed, and subjected to heat treatment under a pressure of 40 Mpa and at a temperature of 95° C. for 1 hour to obtain a sintered body. Except for the above conditions, measurements of the sintered body were carried out in the same manner as in Example 5. The results are shown in Table 3.

Example 8

Two grams of Ag$_2$O powder was weighed, and subjected to heat treatment under a pressure of 980 Mpa and at a temperature of 130° C. for 30 minutes to obtain a sintered body. Except for the above conditions, measurements of the sintered body were carried out in the same manner as in Example 5. The results are shown in Table 3.

Example 9

Figure 4:
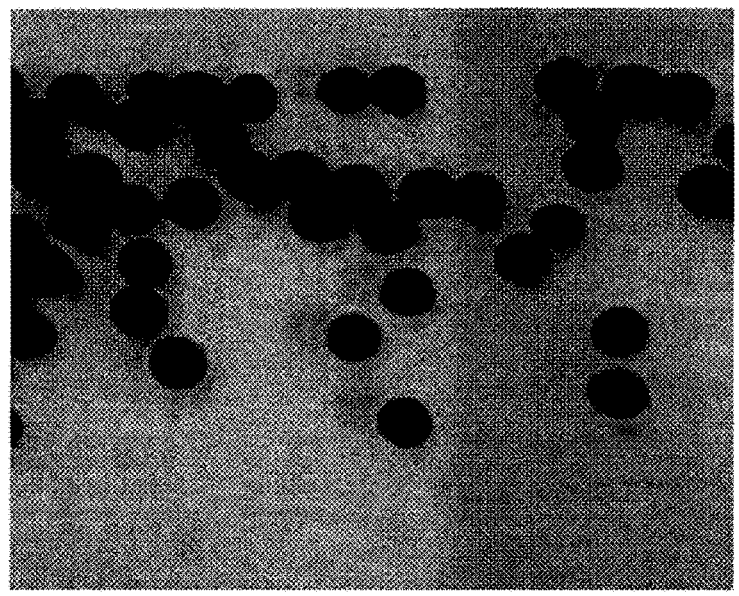
FIG. 4 is a photograph showing the appearance of the cryogenic regenerator material of Example 9.

Ag$_2$O powder was added with sodium alginate and water and kneaded, and then the kneaded product was dropped from a nozzle to a calcium chloride aqueous solution or a calcium lactate aqueous solution to prepare particles having a size of about 1 mm. The particles were dried, and subjected to heat treatment under a pressure of 980 Mpa and at a temperature of 130° C. for 30 minutes to obtain a sample in the form of particles. The appearance of the sample thus obtained is shown in FIG. 4.

Figure 5:
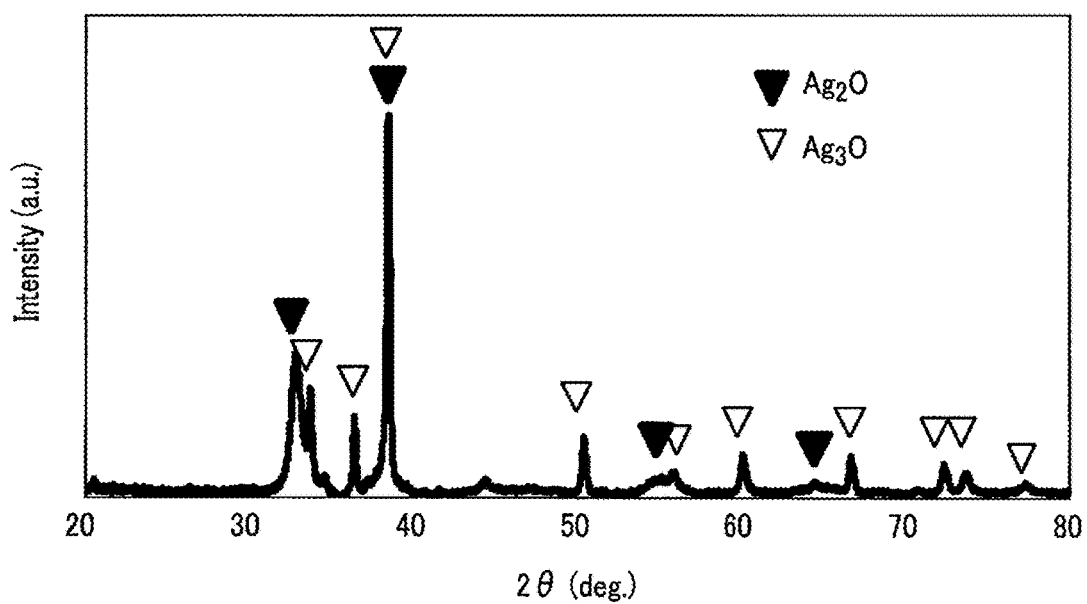
FIG. 5 is an X-ray diffraction spectrum for the cryogenic regenerator material of Example 9.

The sample was subjected to measurements including XRD measurement and specific heat measurement in the same manner as in Example 5. The results are shown in Table 3. FIG. 5 is an X-ray diffraction spectrum for the sample. FIG. 6 is a graph showing a temperature dependence of specific heat for the sample. Thermal conductivity and relative strength were not measured, because significant errors are predicted from the size and shape of the sample.

A cross section of the sample was observed by SEM/EDX. It was found that the first phase of silver oxide (Ag$_2$O) was present at grain boundaries of the second phase of silver oxide (Ag$_3$O). FIG. 7 shows a cross-sectional observation image (backscattered electron image) of the sample. In FIG. 7, the shaded gray area corresponds to Ag$_2$O, and the light gray area corresponds to Ag$_3$O.

TABLE 3

|  | Molar (Ag/O) | Silver oxide first phase | second phase | third phase | Volume [%] | A/B | Specific heat (J/cc · K) | Heat (W/K · m) | Mechanical strength (relative strength*) |
|---|---|---|---|---|---|---|---|---|---|
| Example 5 | 1.5 | Ag$_2$O Cubic | AgO Monoclinic | — | 98 | 2.4 | 1.16 | 1.27 | 1.1 |
| Example 6 | 1.8 | Ag$_2$O Cubic | AgO Monoclinic | Ag$_3$O Hexagonal | 100 | 2.2 | 1.17 | 1.30 | 1.2 |
| Example 7 | 2.0 | Ag$_3$O Hexagonal | AgO Monoclinic | — | 97 | 1.1 | 1.00 | 1.28 | 1.1 |
| Example 8 | 2.5 | Ag$_2$O Cubic | Ag$_3$O Hexagonal | — | 100 | 3.3 | 1.21 | 1.40 | 1.2 |
| Example 9 | 2.5 | Ag$_2$O Cubic | Ag$_3$O Hexagonal | — | 99 | 3.4 | 1.21 | — | — |

*Relative strength shows the relative value where the load value in the measurement of mechanical strength in Example 1 is set at the reference value (1.0).

Example 10

A part of the sintered body prepared in the same manner as in Example 8 was cut out to prepare a sample of about 1 mm square, which was subjected to heat treatment under atmospheric pressure and at 150° C. for 5 minutes. Observation of the sample by SEM/EDX revealed that an Ag coating layer having a thickness of 10 nm was formed on the surface of the sample.

[Specific Heat]

The specific heat of the sample was measured in the same manner as in Example 8. The result is shown in Table 4.

[Relative Relaxation Time]

The sample obtained in Example 10 was measured for the relaxation time of the sample temperature by the following method. The sample obtained in Example 8 was also measured for the relaxation time in the same manner. Table 4 shows the relative relaxation time of Example 10 at 60 K, where the relaxation time of Example 8 at 60 K is set at 1.0. The smaller the relative relaxation time, the faster the heat diffusion velocity.

[Relaxation Time]

In the relaxation method specific heat measurement using a physical property measurement system (PPMS), the temperature change behavior when heat is applied to the sample is measured, and thus the relaxation time of the sample temperature at each temperature can be automatically measured.

Example 11

A part of the sintered body prepared in the same manner as in Example 8 was cut out to prepare a sample of about 1 mm square, which was subjected to heat treatment under atmospheric pressure and at 150° C. for one hour. Observation of the sample by SEM/EDX revealed that an Ag coating layer having a thickness of 10 μm was formed on the surface of the sample. The sample was measured for specific heat and relative relaxation time in the same manner as in Example 10. The results are shown in Table 4.

Example 12

A part of the sintered body prepared in the same manner as in Example 8 was cut out to prepare a sample of about 1 mm square, which was subjected to heat treatment under atmospheric pressure and at 150° C. for one minute. Observation of the sample by SEM/EDX revealed that an Ag coating layer having a thickness of 5 nm was formed on the surface of the sample. The sample was measured for specific heat and relative relaxation time in the same manner as in Example 10. The results are shown in Table 4.

Example 13

A part of the sintered body prepared in the same manner as in Example 8 was cut out to prepare a sample of about 1 mm square, which was subjected to heat treatment under atmospheric pressure and at 150° C. for one hour and 30 minutes. Observation of the sample by SEM/EDX revealed that an Ag coating layer having a thickness of 20 μm was formed on the surface of the sample. The sample was measured for specific heat and relative relaxation time in the same manner as in Example 10. The results are shown in Table 4.

TABLE 4

|  | Molar ratio x (Ag/O) | Thickness of Ag coating layer | Specific heat (J/cc · K) | Relative relaxation time* |
| --- | --- | --- | --- | --- |
| Example 10 | 2.5 | 10 nm | 1.21 | 0.8 |
| Example 11 | 2.6 | 10 μm | 1.19 | 0.7 |
| Example 12 | 2.5 | 5 nm | 1.21 | 0.9 |
| Example 13 | 2.7 | 20 μm | 1.10 | 0.6 |

*Relative relaxation time shows the relative value where the relaxation time of the sample in Example 8 is set at the reference value (1.0).

The regenerator materials of Examples 1 to 13 contain a silver oxide, and the molar ratio x of silver atoms to oxygen atoms: Ag/O is $1.0 \leq x \leq 4.0$. Tables 1 to 3 indicate that they have higher specific heat than the regenerator materials of Comparative Examples 1 and 2, and that they are excellent regenerator materials.

The regenerator materials of Examples 5 to 8 containing at least two phases of silver oxides having different crystal structures (the first and second phases of silver oxides) have higher specific heat, or thermal conductivity, or mechanical strength, and are found to be better regenerator materials compared with the regenerator materials of Examples 1 to 4 not containing two or more phases of silver oxides having different crystal structures.

The regenerator materials of Examples 5, 6, 8, and 9 satisfying the condition of $A/B \geq 1.2$, where A is a half width of a main peak of the first phase of silver oxide and B is a half width of a main peak of the second phase of silver oxide in powder X-ray diffraction spectrum, have higher specific heat and are found to be better regenerator materials compared with the regenerator material of Example 7 for which the condition A/B is made less than 1.2.

The regenerator material of Example 8 containing the first phase of silver oxide $Ag_2O$ having a cubic crystal structure and the second phase of silver oxide $Ag_3O$ having a hexagonal crystal structure, has higher specific heat, thermal conductivity, and mechanical strength, and is found to be better regenerator materials compared with the regenerator materials of Examples 5 to 7 having crystal structures and composition different from those of Example 8.

The regenerator materials of Examples 10 to 13 having an Ag coating layer formed on the surface of thereof show a shorter relaxation time of the sample temperature, or have a faster heat diffusion velocity, and are found to be better regenerator materials compared with the regenerator material of Example 8 having no Ag coating layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A regenerative cryocooler, comprising a cryogenic regenerator material comprising a silver oxide, the molar ratio of silver atoms to oxygen atoms contained in the cryogenic regenerator material: Ag/O being 1.0 or more and 4.0 or less.

2. The regenerative cryocooler of claim 1, wherein the molar ratio of silver atoms to oxygen atoms contained in the cryogenic regenerator material: Ag/O is 1.8 or more and 3.2 or less.

3. The regenerative cryocooler of claim 1, wherein the silver oxide is contained in a ratio of 50% by volume or more based on a whole volume of the cryogenic regenerator material.

4. The regenerative cryocooler of claim 1, wherein the silver oxide is at least one selected from the group consisting of AgO, $Ag_2O$ and $Ag_3O$.

5. The regenerative cryocooler of claim 1, wherein the silver oxide comprises a first phase of silver oxide and a second phase of silver oxide having different crystal structures.

6. The regenerative cryocooler of claim 5, wherein, assuming that A is a half width of a main peak of the first phase of silver oxide and B is a half width of a main peak of the second phase of silver oxide in a powder X-ray diffraction spectrum, the following condition is satisfied: $A/B \geq 1.2$.

7. The regenerative cryocooler of claim 5, wherein a crystal structure of the first phase of silver oxide is cubic, and a crystal structure of the second phase of silver oxide is hexagonal.

8. The regenerative cryocooler of claim 5, wherein the first phase of silver oxide is $Ag_2O$, and the second phase of silver oxide is $Ag_3O$.

9. The regenerative cryocooler of claim 5, wherein the first phase of silver oxide is present at the grain boundaries of the second phase of silver oxide.

10. The regenerative cryocooler of claim 1, further comprising an Ag coating layer on a surface of the cryogenic regenerator material.

11. The regenerative cryocooler of claim 1, further comprising at least one regenerator material selected from a copper alloy mesh and a stainless steel mesh.

12. A system comprising the regenerative cryocooler of claim 1.

13. The regenerative cryocooler of claim 4, wherein the silver oxide is AgO.

14. The regenerative cryocooler of claim 4, wherein the silver oxide is $Ag_2O$.

15. The regenerative cryocooler of claim 4, wherein the silver oxide is $Ag_3O$.

16. The system of claim 12, wherein said system is a superconducting electromagnet apparatus.

17. The system of claim 12, wherein said system is a magnetic resonance imaging (MRI) apparatus.

18. The system of claim 12, wherein said system is a cryopump apparatus.

19. The system of claim 12, wherein said system is a Josephson voltage standard system.

20. The system of claim 12, wherein said system is a single-crystal pulling apparatus.

* * * * *